(12) United States Patent (10) Patent No.: US 6,937,875 B2
Bocconi (45) Date of Patent: Aug. 30, 2005

(54) MOBILE TELEPHONE WITH LOCAL COMMUNICATION OPTION

(75) Inventor: Stefano Bocconi, Amsterdam (NL)

(73) Assignee: Lucent Technologies Inc., Murray Hill, NJ (US)

( * ) Notice: Subject to any disclaimer, the term of this patent is extended or adjusted under 35 U.S.C. 154(b) by 416 days.

(21) Appl. No.: 10/171,446

(22) Filed: Jun. 13, 2002

(65) Prior Publication Data

US 2003/0003946 A1 Jan. 2, 2003

(30) Foreign Application Priority Data

Jul. 2, 2001 (EP) .............................................. 01305709

(51) Int. Cl.⁷ ................................................. H04M 1/00
(52) U.S. Cl. ........................ 455/550; 455/11.1; 455/564
(58) Field of Search ............................... 455/73, 550.1, 455/11.1, 518, 519, 552.1, 553.1, 564

(56) References Cited

U.S. PATENT DOCUMENTS 5,867,768 A * 2/1999 Onda .......................... 455/11.1

2003/0069014 A1 * 4/2003 Raffel et al. ................. 455/426

FOREIGN PATENT DOCUMENTS

| EP | 0 544 100 A1 | 6/1993 | ............ H04M/1/72 |
| EP | 0921668 A2 * | 8/1998 | |
| EP | 001039728 A1 * | 3/1999 | |
| EP | 0 921 668 A2 | 6/1999 | ............ H04M/1/72 |
| EP | 0 933 915 A1 | 8/1999 | ............ H04M/3/56 |
| EP | 1 039 728 | 9/2000 | ............ H04M/1/72 |
| EP | 1 137 240 A2 | 9/2001 | .......... H04M/1/725 |

* cited by examiner

*Primary Examiner*—Nay Maung
*Assistant Examiner*—Angelica M. Perez

(57) ABSTRACT

A mobile telephone has a conventional wireless network call handling unit having a sound output for audibly outputting sound information received from a call in progress. In addition a wireless broadcast unit is provided for broadcasting information locally. The user can command the mobile telephone to broadcast the sound information from the call to one or more receivers in a neighborhood of the mobile telephone. Thus others can listen in on the call. Depending on commands by the users, the receivers may broadcast information back to the mobile telephone, for transmission via the call, together with sound information from the mobile telephone itself.

4 Claims, 1 Drawing Sheet

ID: 6,937,875 B2

MOBILE TELEPHONE WITH LOCAL COMMUNICATION OPTION

CROSS REFERENCE TO RELATED APPLICATION

This application claims priority of European Application No. 01305709.6 filed on Jul. 2, 2001.

BACKGROUND OF THE INVENTION

1. Field of the Invention

The invention relates to a mobile telephone.

2. Description of Related Art

Telephone users often have the desire to share their calls with others. In the prior art, this desire has been addressed by various solution. First of all telephone sets have been provided with loudspeakers to make the sound of an incoming call heard throughout the room in which a telephone set is located. If the user wants to share the call with a number of people in the room, he or she switches on the loudspeakers and possibly a microphone.

In another solution, the telephone network provides for conference calls. A conference call connects a group of more than two users. In a conference call the telephone network routes sound from each member of the group to all other members of the group. Basically, the conference call solution and the loudspeaker solution serve two different situations: one in which participants in a call are located in different locations and another in which a number of participants are located in the same room. Of course, the two can be combined when a sub-group of participants in a conference call are gathered in a single room. The loudspeaker solution has the advantage that it does not require additional connection costs. Also it does not have the complexity involved with establishing conference calls (finding telephone number of participants, dialing etc.).

Both the loudspeaker solution and the conference call solution could be applied to mobile telephones as well. However, the loudspeaker solution is less attractive for mobile telephones, first of all because loudspeakers tend to be bulky and secondly because, unlike conventional telephones, mobile telephones tend to be used in public spaces where speaking conversations out loud is undesirable. Thus, for mobile telephones effectively only the conference call solution is available, at the expense of greater complexity to establish the call and increased connection costs.

SUMMARY OF THE INVENTION

Amongst others, it is an object of the invention to allow mobile telephone users to share calls without the additional network costs involved with conference calls.

The invention provides for a mobile telephone, comprising a wireless network call handling unit having a sound output for audibly outputting sound information received from a call in progress;

a wireless broadcast unit for broadcasting information distinguished from transmission/reception by the call handling unit;

a user interface for receiving a share command from a user;

a connection unit controlled by the user interface and arranged to supply information representing the sound information to the wireless broadcast unit, for rebroadcast of the information to one or more receivers in a neighborhood of the mobile telephone upon the share command, the information representing the sound information being broadcast via an inaudible medium. The mobile telephone according to the invention provides for broadcast of a signal that can be used in another device (preferably another mobile telephone) near the broadcasting mobile telephone to output the call received by the mobile telephone. Thus, on one hand no conference call is necessary to distribute the call and on the other hand the call does not have to be output from the mobile telephone as sound that is audible for everyone near the mobile telephone.

Preferably, the mobile telephone is also equipped to receive such broadcasts from other telephones and to output the sound represented by the broadcast via the normal telephone sound output. Thus, the mobile telephone can be used to listen in to a call received by a nearby mobile telephone, without establishing a call for itself, if the user of that mobile telephone has indicated that that call may be shared. In a further embodiment the mobile telephone can also be used to add talk from the nearby mobile telephones to the shared call.

BRIEF DESCRIPTION OF THE DRAWINGS

These and other objects and advantages of the mobile telephone according to the invention will be described in more detail using the following drawing.

DETAILED DESCRIPTION

Figure 1:
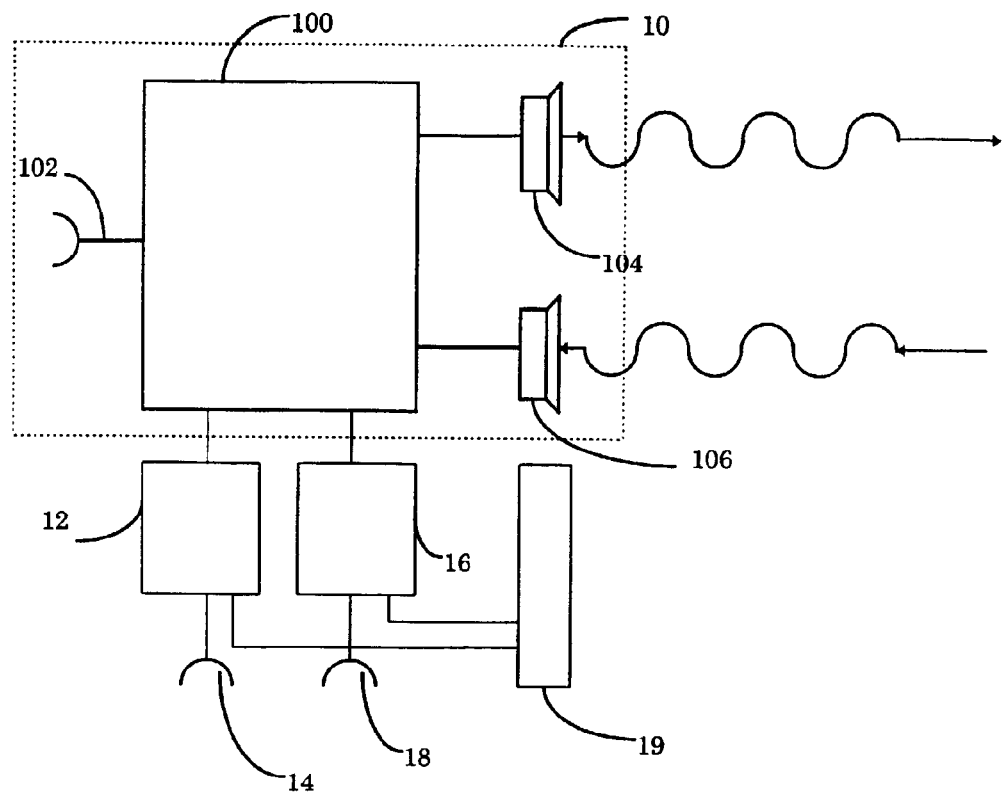
FIG. 1 shows a mobile telephone.

FIG. 1 shows a mobile telephone. The conventional part 10 of the mobile telephone unit contains a network call handling unit 100, an antenna 102, a sound output 104 and a sound input 106. In addition to the conventional part 10, the mobile telephone contains a broadcast receiver 12 with a transmission input 14 and a broadcast transmitter 16 with a transmission output 18 and a user interface 19. (In practice the transmission input 14 of the receiver 12 and the transmission output 18 of the transmitter 16 may be combined in a single antenna, which may even be the antenna 102 of the conventional mobile telephone part 10). The receiver 12 and the transmitter 16 are coupled to the call handling unit 100. The user interface 19 is coupled to the receiver 12 and the transmitter 16. The user interface 19 may also have connections (not shown) to the call handling unit 100.

Figure 2:
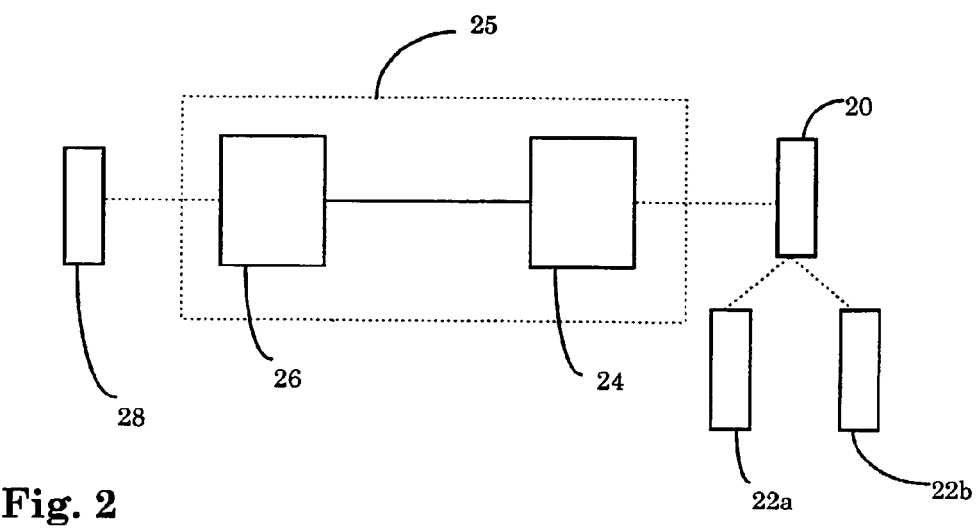
FIG. 2 shows cooperation between a number of mobile telephones.

FIG. 2 shows cooperation between a first mobile telephone 20, a second mobile telephone 28, a number of further mobile telephones 22a, 22b and a network 25. At least the first mobile telephone 20 and further mobile telephones 22a,b are realized as shown in FIG. 1. One or more further mobile telephones 22a,b may be present; by way of example two are shown. A call provides a connection between the first mobile telephone 20 and the second mobile telephone 28, via a first base station 24 in the network which exchanges wireless signals with the first mobile telephone 20, and a second base station 26 in the network 25 which exchanges wireless signals with the second mobile telephone 28. Between the first and second base station 24, 26 the network 25 may also contain a core network (not shown), or a single base station may cover both mobile telephones 20, 28. By way of example a second mobile telephone 28 is shown, but this is not necessary for the invention: any kind of telephone connected to the network 25 may be used instead of second mobile telephone 28.

In operation the first mobile telephone 20 exchanges local signals with further mobile telephones 22*a,b*. A call is established via the network 25 connecting the first mobile telephone 20 and the second mobile telephone 28 in a conventional way, for example using the GSM standard. When the user of the first mobile telephone 20 wants others to share the call he or she commands the mobile telephone 20 via the user interface 19 to start sharing the call. The user interface 19 may for example be menu operated, the user selecting a sharing menu and a start sharing current call option in that menu. When the user has commanded the mobile telephone to start sharing the call, user interface 19 activates transmitter 16 to take a signal that is fed to sound output 104 and feeds this signal to transmission output 18.

In an embodiment, call handling unit 100 outputs a combined signal to transmitter 16, combining the signal that is normally fed to sound output 104 and a signal received from sound input 106, which is normally passed to the second mobile telephone 28 via the network 25. In another embodiment where the mobile telephones 20, 22*a,b* are only intended to operate shared calls at such close range that users can hear each others voice directly, this combination of signals may be omitted, or made optional, to be activated by a command via the user interface.

Transmitter 16 converts the sound information from the call handling unit 100 for example into a high frequency electromagnetic signal radiated from output 18. For example, a blue tooth type of signal may be used. But other kinds of protocols and other kinds of signal, such as modulated ultrasound signals or infrared signals may be used. Preferably, the sound information is encoded digitally into the transmitted signal.

The users of the further mobile telephones 22*a,b* have the option to command their further mobile telephones 22*a,b* via their respective user interfaces 19 to join the shared call. This is realized for example by selecting an appropriate menu option on the relevant further telephone 22*a,b*. In response to the command, the further mobile telephone 22*a,b* activates its receiver 12 to receive the signals broadcast by the transmitter of the first mobile telephone 20 and to pass the received signal to the network call handling unit 100. The call handling unit 100 outputs the sound corresponding to the signal to the sound output 104 that is normally used for outputting the sound from network calls. Thus, the user of the further mobile telephone 22*a,b* is able to listen in to the sound signal received by the first mobile telephone 20 from the network 24, 26 and preferably also to the sound spoken by the user of the first mobile telephone unit for transmission to the network 25.

The latter may be user selectable, so that a user can select between transmitting and/or outputting sound information from second mobile telephone 28 and the words spoken at the first mobile telephone or only sound from the second mobile telephone. Thus, if a further mobile telephone 22*a,b* is close to the first mobile telephone 20, a user may opt to listen to the words of the user of the first mobile telephone 20 "live" only, i.e. not via the further mobile telephone 22*a,b* and when the user is further away he or she may opt to listen to these words via further mobile telephone 22*a,b*. This may be realized by selecting between local sound/no local sound menu options on the first mobile telephone 20, which command whether sound information from sound input 106 is added to the signal transmitted by transmitter 16. Alternatively, both information from sound input 106 and from second mobile telephone may be transmitted separately via transmitter, the user of the further mobile telephone 22*a,b* using a menu option on the further mobile telephone to command whether both or only a single one of the signals is output at the further mobile telephone. Thus, the users of different further mobile telephones 22*a,b* may decide to operate in different modes according to their distance to first mobile telephone 20.

Preferably, mobile telephones 20, 22*a,b* also have the option to pass back words spoken by the users of the further mobile telephones 22*a,b* to the first mobile telephone 20 for output to the second mobile telephone 28 via the network 25 and/or to the sound output 104 of the first mobile telephone 20. For this purpose, the transmitter 16 in the further mobile telephone 22*a,b* and receiver 12 in first mobile telephone 20 may be activated. First mobile telephone 20 and/or further mobile telephone has a menu option to control this activation. Thus, the users of the further mobile telephones 22*a,b* can join in the conversation.

In an embodiment the local transmission or reception may be used also when no call is active, for local communication between mobile telephones. Preferably, the mobile telephone supports activation of local communication from a call only during the call. That is, local communication for each call must be activated once the call has been started, or within a predetermined (short) time before the start of a call (typically less than a minute before the start of the call). Local communication for the call cannot be preactivated an arbitrary time before the call starts. Thus, it is prevented that others may inadvertently be able to listen to a call.

In an embodiment, the privacy of communication between the first mobile telephone 20 and the further mobile telephone 22*a,b* is protected by encryption, for example by including an encyphering unit or channel hopping unit (not shown) in the transmitter 18. As very high security is not required a simple decryption system, such as summing the signals with numbers from a pseudo random sequence may be used. The receiving mobile telephone 20, 22*a,b* contains a corresponding decryption or hopping unit (not shown) in the receiver 12.

At least at the start of call sharing the first mobile telephone 20 and the further mobile telephones 22*a,b* exchange information to enable decryption and/or corresponding hopping, such as a seed of the random sequence. In an embodiment this exchange is time selective, the exchange occurring only if the users of the first mobile telephone 20 and the further mobile telephone activate sharing substantially simultaneously (e.g. less than 1 more seconds from one another). In another embodiment this exchange occurs by means of a highly directional transmitter and receiver (not shown) in the mobile telephone 20, 22*ab*, such as a directed infrared signal, which is coupled to the encryption and decryption unit for example. Thus, the information to enable encryption is exchanged only when the users point their mobile telephones 20, 21*a,b* at each other and select a menu option to enable exchange of information.

By now it will be appreciated that the invention provides for call sharing between different mobile telephones using locally transmitted signals without to use the telephone network to share signals between the locally present mobile telephones. Of course, the signals may be received also with devices other than mobile telephone (such as special "listen in" devices).

What is claimed is:

1. A mobile telephone, comprising
   a wireless network call handling unit having a sound output for audibly outputting sound information received from a call in progress;

a wireless broadcast unit for broadcasting information distinguished from transmission/reception by the call handling unit;

a user interface for receiving a share command from a user;

a connection unit controlled by the user interface and arranged to supply information representing the sound information to the wireless broadcast unit, for rebroadcast of the information to one or more receivers in a neighborhood of the mobile telephone upon the share command, the information representing the sound information being broadcast via an inaudible medium;

a wireless broadcast reception unit coupled to the sound output;

the user interface being arranged for receiving a command of a first type from the user, the user interface being arranged to enable the sound output, upon receiving the command of the first type, to output sound decoded from information received by the wireless broadcast reception unit;

the user interface also being arranged to receive a command of a second type from the user, the user interface being arranged to enable the call handling unit, in response to the command of the second type, to transmit, via the call, the sound information received from the wireless broadcast reception unit; and the call handling unit having a microphone for inputting input sound information for transmission via the call in combination with the sound information received by the wireless broadcast reception unit.

2. A mobile telephone according to claim 1, the call handling unit having a microphone for inputting input sound information for transmission via the call, wherein the connection unit is arranged to supply information representing the input sound information to the wireless broadcast unit, at least when the call handling unit is handling the call, for rebroadcast to the one or more receivers in combination with the sound information, upon a command from the user interface.

3. A mobile telephone according to claim 1, arranged to execute a protocol for establishing an encrypted communication channel via the broadcast unit.

4. A mobile telephone according to claim 1, arranged to communicate local speech signals with the one or more receivers also when the call handling unit is not handling a call.

* * * * *